F. A. WESCOTT.
AUTOMOBILE SIGNAL.
APPLICATION FILED AUG. 31, 1916.
1,279,054.
Patented Sept. 17, 1918.
2 SHEETS—SHEET 2.
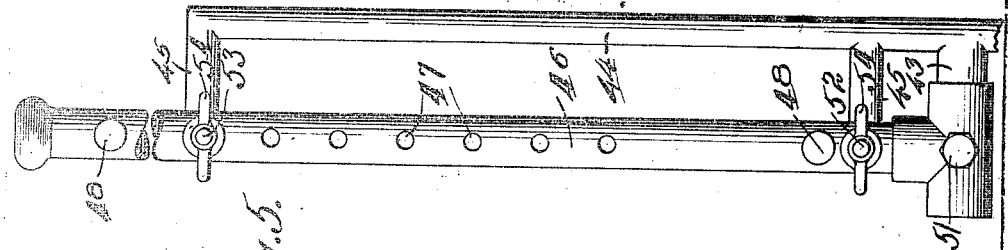
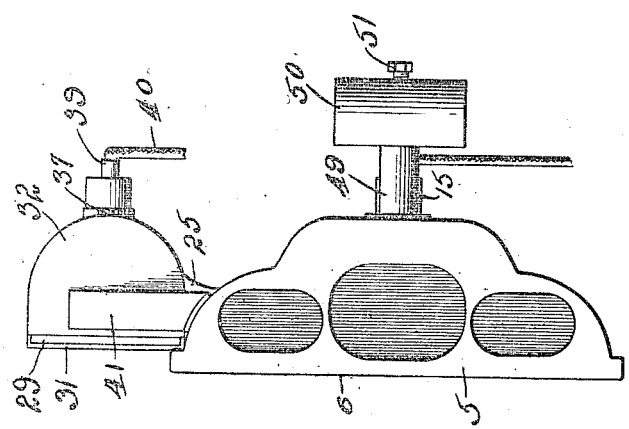
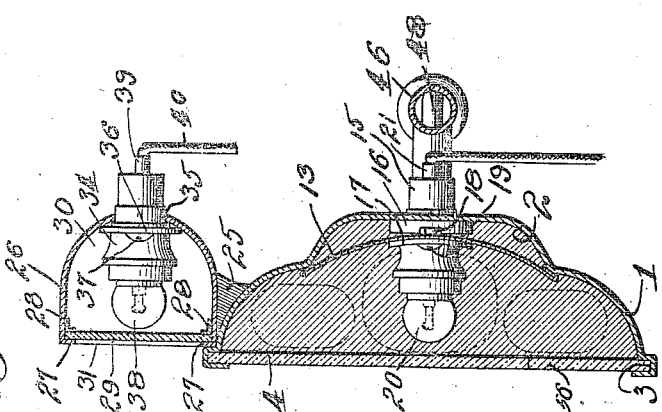
WITNESSES
INVENTOR
Fred A. Wescott
BY
ATTORNEY

UNITED STATES PATENT OFFICE.

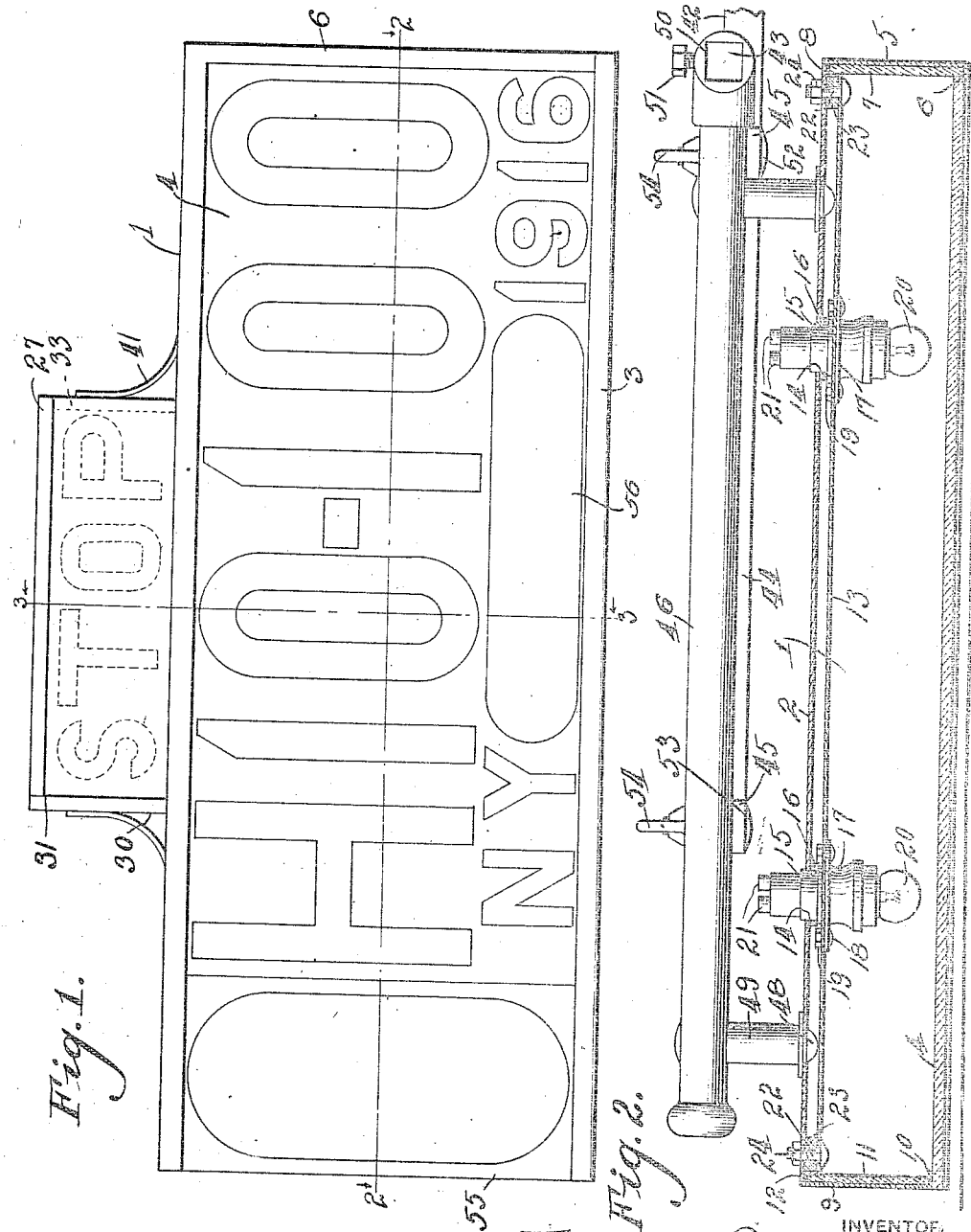

FRED A. WESCOTT, OF CORNING, NEW YORK, ASSIGNOR TO THE WESCOTT-BANKER SIGNAL CO., INC.

AUTOMOBILE-SIGNAL.

1,279,054.

Specification of Letters Patent. Patented Sept. 17, 1918.

Application filed August 31, 1916. Serial No. 117,925.

*To all whom it may concern:*

Be it known that I, FRED A. WESCOTT, a citizen of the United States, residing at Corning, in the county of Steuben and State of New York, have invented certain new and useful Improvements in Automobile-Signals, of which the following is a specification.

This invention relates broadly to signals, and more particularly to an automobile signal.

As the primary object, it is contemplated by this invention to provide a signal for association with the rear end of a motor vehicle constructed to receive illuminating means which acts in conjunction with a transparent number plate for indicating the license number of a vehicle and to also provide an illuminating warning means, both the illuminated means for the plate and the warning means being controlled by suitable switches within reach of the driver of the vehicle, the device being especially adapted for vehicles that have already been wired but portable batteries can be installed so that the device can be conveniently employed by the use of them.

Another object of equal importance as the first mentioned object resides in the provision of an improved signal that is so constructed that it can be readily connected to a suitable bracket support on the vehicle which was heretofore used for supporting the end light and the number plate, this invention aiming particularly to obviate the employment of the end light on the bracket support.

It is a more specific object of this invention to construct novel means for housing the signal, to provide means for conveniently mounting the electric bulb sockets within the housing; to arrange the bulb so as to retain the improved reflector in position; to provide means for removably supporting the number plate in position; to improve the construction of the number plates, and to provide efficient means for removably mounting the device on the vehicle.

A still further object of my invention resides in the provision of a device of the character described that is simple in construction, efficient in operation and one that can be manufactured and placed on the market at a minimum cost.

Other objects as well as the nature, characteristic features and scope of my invention will be more readily understood from the following description taken in connection with the accompanying drawings and pointed out in the claims forming a part of this specification.

In the drawings:—

Figure 1 is a front elevation of my invention.

Fig. 2 is a longitudinal section taken on line 2—2 of Fig. 1 in the direction in which the arrows point.

Fig. 3 is a transverse section taken on line 3—3 of Fig. 1 in the direction in which the arrows point.

Fig. 4 is an end elevation.

Fig. 5 is an elevational detail of the bar which is employed when the signal is being attached.

Referring more particularly to the drawings in which similar reference numerals designate like and corresponding parts throughout the several views, I provide a main casing comprising a back formed of any desirable metal and arcuate in cross section. This back is bent to provide a longitudinal recess 2 which extends throughout the length thereof while the marginal edges of the back are bent to provide oppositely disposed retaining grooves 3 adapted to receive the front wall or transparent number plate 4. It is desirable that the letters and numbers on this plate be blown therein and painted on the inner surface a color different from the color of the rest of the plate. The inward sliding movement of the number plate is limited by a side piece 5 and the colored glass 7. The side piece 5 preferably conforms to the configuration of the back and in alinement with the outer surface thereof. The plate is also provided with a flange 6 which serves to retain a piece of colored glass 7 against the side. Another securing flange 8 is carried by the back or rear wall 1 and serves to insure the retention of the glass 7 in proper position. Another side piece 9 is connected on the opposite end of the casing and has its outer edge bent inwardly to provide a supporting flange 10 which facilitates the insertion of the number plate 4. It is desirable that side pieces 5 and 9 have openings therein so that when the illuminating means is secured and lighted the colored rays will be projected through the openings because of the piece of colored glass. This flange 10 also facilitates the securing of another piece of glass 11 different in color from the piece 7, the inner end being securely held in position by means of a securing flange 12 carried by the inner surface of the back 1. The flanges 8 and 12 may be similarly formed and attached to the back wall 1.

Preparatory to the insertion of the number plate 4, I have arranged longitudinally in the casing a transversely curved reflector plate 13, the side edges of the plate being arranged against the edges of the recess 2 as illustrated to advantage in Fig. 3 of the drawings. The reflector plate 13 and recess 2 are provided with a plurality of alining openings 14 and in securing the plate in position I have employed an improved illuminating means for the casing which consists of electric sockets 15, the sockets 15 passing through the alining openings 14. It is to be noticed that the sockets are provided with collars 16 between the plate 13 and the back. The collars then also serve to maintain the plate in spaced relation to the back and to form one wall of the recess. Annular flanges 17 are integral with the sockets and bear against the outer surface of the plates. The flanges may be held in position by suitable fastening devices such as are shown by the bolts 18 and nuts 19. Suitable electric lamps 20 are connected in the sockets, the light from the lamps being reflected through the glass by the plate 13. It is desired that the vehicle to which the device is connected be wired so that it will be only necessary to connect wires to the terminals 21 of the sockets. The plate is also held in position by bolts 22 which extend through the respective ends of the plate and recess engaging spacing collars 23 which have been previously arranged therebetween, being finally connected by nuts 24.

Arranged on the body of the rear wall 1 and secured intermediate the ends thereof by a block 25 is a secondary or auxiliary casing. As shown, it consists of a substantially semi-cylindrical body 26 the outer edges of which are bent to provide flanges 27 that coöperate with securing flanges 28. These flanges are secured to the body to provide oppositely disposed grooves for retaining a front transparent wall or number plate 29. It is desirable that a part of this glass be ground so as to procure the word Stop so that the word will only appear when the illuminating means is lighted. One side wall 30 connected to the body has a flange 31 arranged in alinement with the flanges 27 so as to limit the movement of the number plate and retain it in position. The opposite side 32 is bent inwardly to provide a flange 33 which is in alinement with the flanges 28 and serves to support and guide the plate in position. An electrical socket 34 extends through an opening 35 in the semi-cylindrical body. An annular flange 36 bears against the inner surface of the casing while a nut bolt arrangement 37 serves to retain the socket in position. An electrical bulb 38 is removably connected in the socket and serves to illuminate the casing so that the word Stop or other word can be conveniently displayed to any motorist in the rear of the vehicle to which the device is attached. Contacts 39 receive the conducting wires 40 and it is desired that the device be controlled by the driver of the vehicle. Supporting brackets 41 are connected to the main casing and to the sides of the secondary casing to insure the tension of this casing in proper position.

In order to connect the entire device to a motor vehicle, I have illustrated a conventional form of bracket 42 to which the usual rear end or tail lamps and number plates are connected. This bracket consists of a main vertical rod 43 and a horizontally extending arm 44 integral therewith and vertically extending auxiliary vertical arms 45 arranged parallel to each other. Usually the rear end light is connected to the vertical arm 43 while the number plate is connected to the upstanding arms 45. In the present instance however, I provide a tubular bar 46 provided with a plurality of uniformly spaced registering openings 47. Suitable fastening devices extend horizontally from the recess 2 in the rear wall and have spacing sleeves 49 arranged thereabout, the bar 46 being finally secured to the outer ends of these fastening devices, the sleeves holding the bar in spaced parallel relation with the rear surface thereof. A vertical sleeve 50 is integral with one of the ends of the bar 46 and is adapted for engagement with the vertical arm 43 of the bracket support on the vehicle being adjustably held in position by means of a set screw 51. Bolts 52 and 53 extend through openings 47 in the bar 46 and are engageable by inner nuts 54. It will be noted that the bolt 52 is arranged so as to engage one of the vertical arms 45 and the bar is held in rigid relation with respect to this arm by means of a winged nut 54. The other bolt 53 may be inserted in any of the openings 47 should the distance between the arms 45 be varied or changed. This will provide for adjustment, that when made may be retained by wing nuts 54.

In use it is thought that the advantages of my invention will be readily apparent. At this point it may be stated that it is desirable that the main number plate 4 have white letters and numerals representing the license number as well as the initials of the State issuing the license. It is preferable that a portion of the glass be painted black. As indicated by the numeral 56 a portion of the glass may be colored red and thereby conform to any law requiring a tail light independent of any illuminated license number. By employing an auxiliary casing, the stop signal will be displayed only when the illuminating means in this casing is illuminated. It will be apparent that when the illuminating means in the main casing is lighted the transparent plate because of its arrangement provides both the end light and the illuminated number plate while the stop signal is constructed so that it will be displayed only at the desired time.

Although I have shown and described the preferred embodiment of my invention I desire it to be understood that I am not to be limited to the exact detail shown, however, I desire that great stress be laid upon the arrangement of the signal connecting the main and secondary casing and the illuminating means which act upon the transparent plates will display signals. Attention is also directed to the reflector plate and means for arranging it within the casing as well as the means for connecting the guiding plate to the suitable bracket on the motor vehicle.

From the above description taken in connection with the accompanying drawing, it can easily be seen that I have provided a device that is simple in construction, containing but a few simple parts that can be cheaply manufactured and assembled and when assembled can be placed upon the market and sold at a minimum cost.

It will be understood that the above description and accompanying drawings comprehend only the general embodiment of my invention and that various minor changes in detail of construction, proportion and arrangement of the parts may be made within the scope of the appended claims and without sacrificing any of the advantages of my invention.

Having thus fully described my invention, what I claim as new and desire to secure by Letters Patent, is:—

1. A vehicle signal, comprising a main casing having a rear wall and including a longitudinal recess, the outer edges of said rear wall being bent to provide the oppositely disposed grooves, a transparent number plate slidably and removably mounted in the grooves in the casing, a transversely curved reflector plate arranged longitudinally within the casing, means for fastening and spacing the reflector so that its longitudinal edges engage with the arcuate portion of the rear wall to form a chamber between the wall and reflector and closing the recess, electric sockets connected to the reflector plate and passing through the recess, electric bulbs in the sockets for illuminating the casing so that the rays therefrom will be directed through the transparent plate by the reflector plate, and a bracket carried by the rear wall of the casing and adapted for connecting the device to a vehicle.

2. A vehicle signal which comprises a casing having a rear wall arcuate in cross section and including a longitudinal recess, the outer edges of said wall being bent to provide oppositely disposed grooves, a transparent plate slidably and removably mounted in the grooves in the casing, an elongated transversely curved reflector plate arranged longitudinally within the casing, means for securing the reflector in a spaced relation to a portion of the rear wall so that the sides of the reflector engage with the arcuate portion of said wall and the reflector serves to cover said recess, electric sockets connected to the reflector plate and passing through the recess, electric bulbs in the sockets for illuminating the casing so that rays therefrom will be directed through the transparent plate by the reflector plate, and a bracket on the main casing for engaging with a suitable support on a vehicle.

In testimony whereof I affix my signature in presence of two witnesses.

FRED A. WESCOTT.

Witnesses:
THOS. HOPPER,
N. H. PALMER.